J. K. STEWART.
MAGNETIC SPEEDOMETER.
APPLICATION FILED AUG. 18, 1911.
1,054,996.
Patented Mar. 4, 1913.
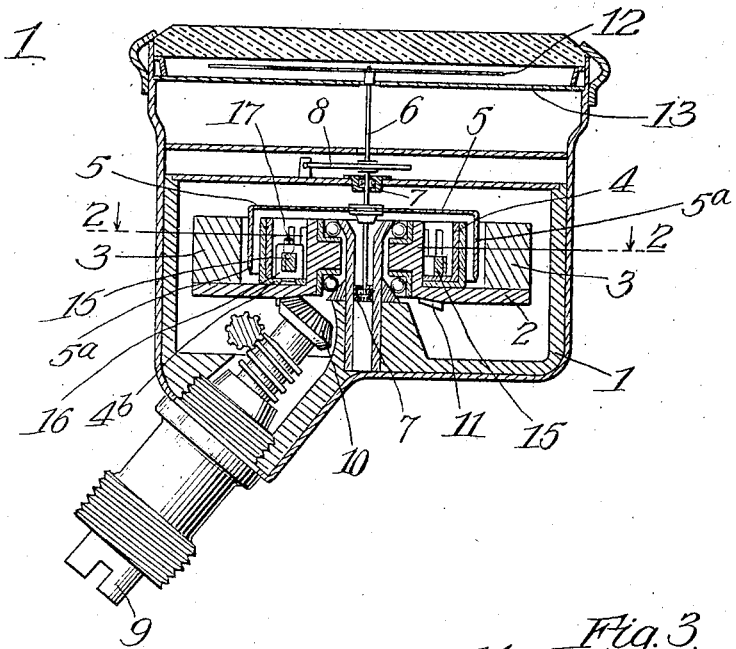
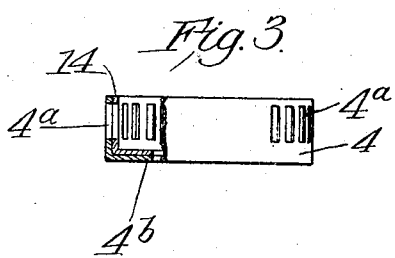
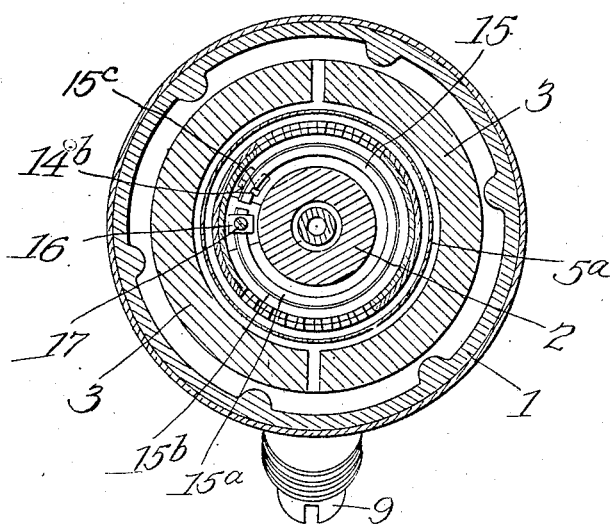
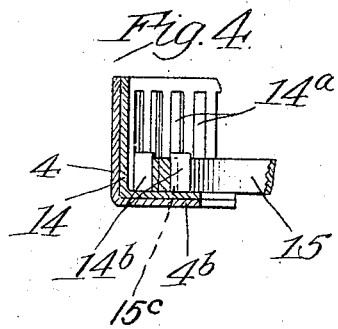
Witnesses:
P. J. Gathmann
Robt. H. Burton
Inventor:
John K. Stewart
By Burton & Burton
his Attorneys

UNITED STATES PATENT OFFICE.

JOHN K. STEWART, OF CHICAGO, ILLINOIS, ASSIGNOR TO STEWART-WARNER SPEEDOMETER CORPORATION, OF THE STATE OF VIRGINIA.

MAGNETIC SPEEDOMETER.

1,054,996.　　Specification of Letters Patent.　　Patented Mar. 4, 1913.

Application filed August 18, 1911. Serial No. 644,732.

*To all whom it may concern:*

Be it known that I, JOHN K. STEWART, a citizen of the United States, residing at Chicago, in the county of Cook and State of Illinois, have invented new and useful Improvements in Magnetic Speedometers, of which the following is a specification, reference being had to the accompanying drawings, forming a part thereof.

The purpose of this invention is to provide in combination with a magnetic speedometer, means for automatically adjusting the parts thereof to compensate the errors of indication otherwise introduced by changes of temperature.

It consists of the features and elements described and shown in the drawings as indicated in the claims.

In drawings:—Figure 1 is a vertical section of a speedometer embodying this invention. Fig. 2 is a horizontal section of the same taken as indicated at line 2—2 on Fig. 1. Fig. 3 is a detail elevation of the elements, 4 and 14, hereinafter described. Fig. 4 is an enlarged detail view showing the connection between the elements, 14 and 15.

The speedometer illustrated in the drawings is constructed in general along well known lines, being operated by the principle of "magnetic drag". It comprises a case, 1, having journaled within it a carrier, 2, upon which are mounted a pair of magnets, 3, 3, each semi-circular in form. Within the circle occupied by the magnets, 3, 3, there is also mounted upon the carrier a ring, 4, of soft iron, whose purpose is to concentrate the lines of force radiating from the magnets and thus to strengthen the magnetic field in their vicinity. The ring, 4, is spaced apart from the magnets by a short distance, leaving an annular space into which there protrudes the flange or vertical wall, 5ª, of the non-magnetic element, 5, which is shown in the form of an inverted cup carried by a spindle, 6, and journaled in jewel bearings, 7, being biased toward a position of rest by a spring indicated at, 8. The driving shaft, 9, terminating in a miter gear, 10, which meshes with a gear, 11, on the carrier, 2, is designed for operative connection with the rotating element whose speed is to be measured so that the rotation of such element will cause a continuous rotation of the carrier, 2, with the magnets, 3, 3, upon it. According to a well understood law which need not here be further explained, the rotation of the magnets, 3, 3, produces what is known as a magnetic drag, which acts upon the non-magnetic element, 5, tending to bias it away from its position of rest. The amount by which the element, 5, is deflected from its position of rest being proportional to the speed of rotation of the magnets, 3, 3, an indication of speed is obtained by fitting the spindle, 6, with an index needle, 12, positioned to swing over a dial plate, 13, in the top of the case.

As is well understood, the effectiveness of the magnetic drag upon the element, 5, depends upon the electrical conductivity of the latter, and since this electrical conductivity is somewhat reduced by an appreciable rise of temperature, the amount of deflection of the cup, 5, and the needle, 12, will vary with changes of temperature and the indication of speed will not be a true one unless some means of compensating this error is employed. The present invention consists in providing the soft iron ring, 4, with a series of apertures, 4ª, in the vicinity of the poles of the magnets, 3, 3, and mounting within the said ring, 4, a second ring, 14, also of soft iron. This inner ring, 14, is provided with apertures, 14ª, corresponding in spacing and dimensions to those of the ring, 4, so that by slightly rotating the ring, 14, within the ring, 4, the apertures of the latter may be partially or wholly closed, and in this way a variable area of soft iron may be presented to the lines of force of the magnetic field about the poles of the magnets, 3, 3, and the effectiveness of the soft iron rings in concentrating this field toward the annular space into which the cup, 5, is projected, may be varied, and this variation of the strength of the magnetic field may be employed to compensate for the change of effectiveness of the field with change of temperature. The movement of the ring, 14, with respect to the ring, 4, is arranged to be accomplished thermostatically by means of a bi-metallic bar, 15, composed of two strips, 15ª and 15ᵇ, of different metals, respectively, and coiled within the soft iron rings in the shape of the letter C, with one end rigidly secured to the ring, 4, and the other end operatively connected to the ring, 14.

Fig. 1 illustrates a rectangular yoke, 16, which is riveted to the base flange, 4ᵇ, of the ring, 4, and is provided with a set screw, 17, which engages the end of the bar, 15; while the other end of the bar, as may be understood from Figs. 2 and 4, is embraced between a pair of upstanding lugs, 14ᵇ, on the base flange of the ring, 14, one of the lugs being accommodated in a vertical groove 15ᶜ in the side of the bar 15, so as to definitely engage it for moving it. If the metal, 15ᵃ, on the inside of the curved ring, 15, has a higher coefficient of expansion than the metal of the strip, 15ᵇ, then with a rise of temperature the bar, 15, will tend to straighten out or reduce its curvature, with the result that its opposite ends will spread apart, causing a slight movement of the rings, 4 and 14, with respect to each other, and altering the condition of registration of the apertures, 4ᵃ and 14ᵃ. If the parts be so adjusted that this alteration amounts to reducing the size of the apertures, then with proper proportions of the various parts the magnetic field can be strengthened just enough to compensate for the decrease of conductivity, which an increase in temperature occasions in the non-magnetic element, 5, and the magnetic drag operating between the said field and the element, 5, may be kept practically constant throughout the range of temperatures to which the instrument would ordinarily be subjected.

As may be seen from Fig. 2, each of the magnets, 3, is semi-annular or rather, just short of semi-annular in form and is mounted to rotate about its own axis. This arrangement of the magnetic element has the advantage of providing two pairs of poles, each pair being separated by a gap so that a field of force is created at two places symmetrically located with respect to the axis of revolution. This results in a better balanced torque with respect to the biased element, 5, than when a single magnet in the form of a split ring is employed, and experience seems to indicate that an increase of efficiency is also obtained as a result of the provision of two pairs of poles in place of the single pair which exists in the split ring or C-form of magnet.

It will be understood that these advantages are not confined to the use of two magnets, as shown in the drawings, but that they might be present even to a greater degree if the annular magnetic element were divided into several segments, each separated from the adjacent segments at the poles. Preferably, where two or more segments are employed, they are positioned with unlike poles facing each other, since this arrangement best serves to prevent deterioration of their magnetic qualities.

I claim:—

1. In a magnetic speedometer, in combination with a revoluble magnet, an opposed magnetic mass or armature, an interposed element of low electrical resistance mounted for rotation, and means for biasing it against rotation in one direction, the magnetic mass being composed of a member having an aperture positioned opposite the magnet poles and another member adapted to close the aperture, said armature members being relatively movable to vary the extent of such closure of the aperture.

2. In a magnetic speedometer, in combination with a rotatable magnetic field, a biased element mounted for oscillation in the field, and an armature positioned for concentrating the field in the path of oscillation of said biased element, said armature comprising two members, the area of one of which is interrupted and the other positioned for spanning or covering such interruption, said armature members being relatively movable to vary the extent of the interruption remaining uncovered, and means for effecting such relative movement.

3. In a magnetic speedometer, in combination with a revoluble magnet, an opposed magnetic mass or armature, an interposed element of low electrical resistance mounted for rotation, means for biasing said element against rotation in one direction, the magnetic mass being composed of a member having an aperture positioned opposite the magnet poles and another member adapted to close the aperture, said armature members being relatively movable to vary the extent of such closure of the aperture, and a thermostatic device operatively connected with the armature members for effecting their relative movement.

4. In a magnetic speedometer, in combination with a revoluble magnet, an opposed magnetic mass or armature, an interposed element of low electrical resistance mounted for rotation, means for biasing said element against rotation in one direction, the magnetic mass being composed of a member having an aperture positioned opposite the magnet poles and another member adapted to close the aperture, said armature members being relatively movable to vary the extent of such closure of the aperture, and a bi-metallic curved bar having its ends connected, respectively, to the two armature members for causing their relative movement with change of temperature.

5. In a magnetic speedometer, a magnet element mounted for rotation and comprising a plurality of magnets, each a segment of an annulus, whose axis is the axis of rotation; a biased element mounted for oscillation in the field of said magnet element and an armature positioned for concentrating said field in the path of oscillation, of said biased element.

6. In a magnetic speedometer, a magnet element mounted for rotation and comprising a plurality of magnets, each a segment of an annulus whose axis is the axis of rotation, such magnets being assembled with their respectively opposite poles facing each other; a biased element mounted for oscillation in the field of the magnet element, and an armature positioned for concentrating said field in the path of oscillation of the biased element.

In testimony whereof, I have hereunto set my hand at Chicago, Ill., this 11th day of August, 1911.

JOHN K. STEWART.

Witnesses:
 CHAS. S. BURTON,
 EDNA M. MACINTOSH.